Patented Aug. 5, 1941

2,251,547

UNITED STATES PATENT OFFICE 2,251,547

ART OF PREPARING DERIVATIVES OF ANACARDIC ACID

Emil E. Novotny, Oak Lane, and George Karl Vogelsang, Frankford, Pa., assignors to Durite Plastics, Incorporated, Philadelphia, Pa., a corporation of Pennsylvania No Drawing. Application June 19, 1937, Serial No. 149,098

19 Claims. (Cl. 260—473)

The invention relates to the art of preparing derivatives of anacardic acid, and has for its primary object the preparation in a practical and economical manner of a new class of materials derived from anacardic acid, which are possessed of outstanding properties in the way of chemical reactivity, compatibility and physical characteristics, and which because of said properties are admirably suited for a large number of industrial applications.

Another important object is to provide a new class of materials derived from anacardic acid, which are particularly well adapted for the preparation of printing inks, varnishes, lacquers, synthetic resins and molding compositions.

Another object of equal importance is to provide a new class of materials derived from anacardic acid, which are suitable for incorporation with natural and synthetic gums, resins and rubbers for the purpose of improving or modifying the desirable properties of said materials.

A further object is to provide a new class of insecticides or germicides.

Still another object is to provide a new class of wood preservatives.

More particularly stated, the invention has reference to the esters or esterification products of anacardic acid.

By way of introduction, it may be stated that anacardic acid is the principal ingredient of the shell liquid of the cashew nut (*Anacardium occidentale*). The acid constitutes about 90% of the shell liquid, the other 10% being chiefly cardol. The shell liquid, which will hereinafter be referred to as Cnsl, has been used for many years as a protective coating and impregnating agent to preserve lumber and furniture from insects. More recently, it has found considerable use in the preparation of printing inks, varnishes, lacquers, synthetic resins and molding compositions. Anacardic acid itself has been suggested for the same purpose.

Novotny, one of the joint applicants, has discovered that the esters of anacardic acid may be used for the same purposes and in much the same manner as Cnsl or the free anacardic acid, but with unexpected and greatly improved results. The esters may be used in the preparation of printing inks, varnishes, lacquers, synthetic resins and molding compositions, and may be incorporated with natural or synthetic gums, resins and rubbers for the purpose of improving or modifying their properties. The esters may also be used to advantage as wood preservatives and insecticides or germicides.

As far as we have been able to ascertain by a search through the chemical literature, the methyl ester is the only ester of anacardic acid which appears to have been prepared prior to the researches which culminated in the present invention. S. Ruhemann and S. Skinner (Ber. 1887, 20, 1861) are said to have prepared the methyl ester after the manner of classical chemistry, a procedure which is entirely unsuited for present day industrial and economic standards.

We have found that many of the usual methods for preparing esters are wholly unsuitable for the esterification of anacardic acid. This is undoubtedly due to the physico-chemical character of the acid. Not only is the acid susceptible to decomposition with the splitting off of the carboxyl group (decarboxylation) when severely heated, but the presence of an unsaturated linkage in the aliphatic side chain tends to bring about various condensation reactions, particularly in the presence of powerful or energetic catalysts such as are normally suitable for esterification.

We have now found that anacardic acid can be esterified by means of various alcohols provided that suitable conditions as to proportions, catalyst, temperature, time, etc. are fulfilled. We have also found that the specific manipulative procedure in producing a particular ester depends in a large measure upon the physico-chemical characteristics of the particular alcohol used in the esterification. Thus, there is one particular procedure that is well suited to esterification with the lower water-soluble mono-hydric alcohols, another procedure well adapted for esterification with the higher aliphatic alcohols which are readily distillable but not completely water soluble, and thirdly there is still another procedure which is best suited for the production of anacardic esters derived from high boiling, difficultly-distillable alcohols.

In its broadest aspects, the method of esterifying anacardic acid by means of alcohols consists in heating a mixture containing the following reagents:

(a) Anacardic acid;

(b) The alcohol corresponding to the desired ester; and (c) A catalyst capable of furnishing hydrogen ions to the extent that the hydrogen ion concentration (CH) will be depressed below $10^{-3}$, that is, a pH of 3.

The acid and alcohol should be present in at least molecular proportions. In the case of readily-distillable alcohols such as the methyl, ethyl, propyl, isopropyl, amyl and butyl alcohols, the alcohol should preferably be in excess of the acid, while in the case of high boiling alcohols the reagents should preferably be present in equimolecular proportions.

Sulphuric acid is a suitable catalyst but it must not be present in such large quantities as to cause resinification. About one tenth to one quarter of a per cent of sulphuric acid (by volume on the anacardic acid) has been found suitable for the esterification of relatively pure anacardic acid.

The following is a suitable mode of procedure for preparing an ester of a water-soluble, readily-distillable alcohol such as methyl, ethyl, propyl and isopropyl alcohols:

A mixture containing the alcohol corresponding to the desired ester, anacardic acid and a catalyst such as sulphuric acid is grought up to the boiling point and refluxed. The water of esterification is then distilled off. The alcohol is preferably present in excess of the anacardic acid, and the catayst is preferably present in an amount between one tenth and one quarter of a per cent of the anacardic acid by volume. Fresh alcohol is let run into the reaction vessel, either intermittently or continuously, to replace the alcohol which distills over with the water.

The fact that the water of esterification which has a tendency to stop the process is being distilled off and additional alcohol is being added to replace the distilled alcohol permits the esterification to go practically to completion. When a sufficient percentage of the anacardic acid has been esterified, the catalyst is preferably neutralized by the addition of a basic substance such as lime, soda ash, calcium carbonate, triethanolamine, etc. Depending upon the use to which the ester will be put, there may be no objection to leaving the material formed by the neutralization in the ester. After the neutralization, the temperature is raised sufficiently to drive off all the residual water and alcohol, leaving behind a substantially pure ester.

The foregoing procedure is also suitable for the preparation of esters of certain ether alcohols such as the mono ethers of glycol. The procedure can be arranged to be either continuous or intermittent, and the alcohol which is distilled over with the water of esterification may be subjected to fractional distillation in a manner well known to the art and put back into the process.

If the ester prepared in the manner above outlined still contains some free anacardic acid, this may be removed in various ways. One suitable manner consists in dissolving the ester in a water-insoluble solvent such as benzene and shaking the benzene solution with an aqueous alkaline solution to extract the free acid. The acid-free solvent layer containing the anacardic ester is then subjected to evaporation, leaving behind the pure ester.

The esterification of anacardic acid by means of methyl, ethyl, propyl or isopropyl alcohol can be facilitated very materially by adding to the reaction mixture a volatile solvent such as benzene, toluene, or ethylene dichloride and conducting the reaction under pressure of the order of 5 to 20 atmospheres. The volatile solvent is not miscible with water but is capable of forming an azeotropic mixture with water. The effect of the pressure is to permit the use of higher temperatures which in turn results in speeding up the esterification. The use of the volatile solvent permits the taking off of the water of esterification with greater ease. The combined effect of both expedients is that but small quantities of alcohol distil over with the solvent-water mixture, thus rendering it possible to employ small quantities of excess alcohol. The solvent-water mixture which distils over separates into two layers. The upper solvent layer may be returned to the reaction mixture and the lower aqueous layer may be discarded.

The following procedure is suitable for preparing esters of higher aliphatic alcohols which are readily distillable but not completely water-soluble:

The alcohol, which may be one of the various amyl or butyl alcohols, preferably in excess, is mixed with anacardic acid together with a small quantity of a suitable catalyst such as sulphuric acid. The catalyst may be in an amount equal to one tenth to one quarter of a per cent (by volume) based on the anacardic acid. The mixture in a suitable reaction vessel is brought to boiling and refluxed for about two hours. The mixture is then subjected to slow fractional distillation.

The distillate which is a mixture of alcohol and water stratifies into two layers. The upper layer which contains the alcohol may be returned to the reaction vessel to produce further esterification, and the lower layer which contains the water may be discarded.

The use of the expression "anacardic acid" in the claims is intended to mean anacardic acid itself as well as materials containing anacardic acid, such as cashew nut shell liquid, wherever the context permits.

The practical completion of the esterification is indicated by the fact that no more water separates out in the distillate. The distillation is preferably continued beyond this point to drive off all the surplus alcohol. Care must be taken that the temperature of the material in the reaction vessel does not rise too high during the driving off of the excess alcohol. Too high a temperature may result in undue resinification of the ester.

The catalyst may be neutralized in the manner previously described. It has been found preferable to neutralize the catalyst before all the alcohol is distilled off, and the final distillation step may advantageously be carried out under a partial vacuum. Otherwise, the ester may be impure and somewhat discolored.

The specific procedures already described are not particularly well suited for the production of esters corresponding to alcohols which have high boiling points. Among the alcohols included in this group are the aliphatic alcohols having eight or more carbon atoms such as certain of the octyl or nonyl alcohols, the aromatic alcohols such as benzyl alcohol, the heterocyclic alcohols such as furfuryl alcohol and tetra hydro furfuryl alcohol, and certain ether alcohols such as the mono ethers of diethylene glycol. The heating of anacardic acid with any of these alcohols to the boiling point of the alcohol to produce esterification generally results in undue resinification of the anacardic acid.

The procedure in the case of the foregoing alcohols comprises mixing the alcohol corresponding to the desired ester with the anacardic acid in molecular proportions, and heating the mixture in the presence of a catalyst such as sulphuric acid to a temperature of 150° to 200° C. The sulphuric acid is preferably present in the amount of one tenth to one quarter of a per cent by volume based on the anacardic acid.

It is to be noted that when furfuryl alcohol is used to esterify anacardic acid, care must be exercised to reduce to a minimum the formation of resinous materials.

The process can be speeded up very considerably by adding a volatile solvent to the reaction mixture, which is not miscible with water but which is capable of forming an azeotropic mixture with water. A suitable solvent is benzene, toluene, or ethylene dichloride.

The equipment is of such construction that the volatile solvent can distil off carrying with it the water of esterification. When the distillate is condensed, it stratifies and separates into two layers. The layer containing the volatile solvent may be returned to the reaction vessel to carry off a further quantity of water from the process.

Another variation of the process consists in blowing a gas such as air or carbon dioxide through the heated reaction mixture in order to further assist in driving off the water of esterification.

The completion of the esterification can be ascertained by the fact that the acidity of the reaction mixture drops to very small values. When this point is reached, the catalyst is neutralized in the manner previously described. If the resultant ester contains small amounts of anacardic acid, this is also removed as has been previously pointed out.

We have further devised a method for preparing the mono esters of glycols.

In its broad aspects, this method comprises reacting on the anacardic acid with an alkylene oxide at an elevated temperature in the presence of an alkali metal acetate such as sodium or potassium acetate.

This particular procedure is well suited for the production of the mono esters of the simpler glycols such as ethylene and propylene glycol, for which purpose the ethylene oxide and propylene oxide respectively would be employed.

In addition to the foregoing methods, we have devised a general method by means of which it is practical to produce most of the esters to which reference has been made.

This method in its broadest aspect consists in first forming an alkali salt of anacardic acid and then reacting the salt with an organic chloride or sulphate having an organic radical corresponding to the ester which it is desired to produce.

The salt of anacardic acid, which may be either sodium or potassium anacardate, is mixed with the chloride, which may be the chloride or sulphate corresponding to methyl, ethyl, propyl, or other alcohol, and the mixture is heated to between 100° and 200° C. The mixture is preferably stirred or agitated well during the heating. It has been found advantageous to add a small quantity of water to the reaction mixture together with some free alcohol, which may preferably be the alcohol corresponding to the organic chloride.

This reaction can best be carried out in a high pressure autoclave, particularly in the case of the methyl and ethyl chlorides which have very high vapor pressures at the reacting temperatures. It has been found that good stirring is an important factor in facilitating the interchange of organic radical for the alkali metal of the salt.

The use of high pressures, particularly in the case of the lower esters, may be obviated by employing organic sulphates or hydrogen sulphates instead of the corresponding chlorides. Thus, for the preparation of the methyl, ethyl or propyl esters we may employ the dimethyl, diethyl or dipropyl sulphates or the corresponding hydrogen or acid sulphates.

The foregoing procedure is particularly attractive from an economical view point for the preparation of certain butyl, amyl and hexyl esters of anacardic acid, as the corresponding butyl, amyl and hexyl chlorides are readily and cheaply produced on a large scale from properly fractionated petroleum distillates.

The anacardic esters prepared by the foregoing processes from anacardic acid, depending upon their ultimate purity, range from more or less viscous liquids to soft solids and crystalline masses. They are generally discolored, but more or less of the color may be removed by means of decolorizing carbon.

For many of the industrial purposes for which the esters are suitable, it is not at all necessary that they be in a pure light-colored state. Hence, in many cases it is wholly unnecesary to start with chemically pure reagents or to purify the product. This fact is of particular importance for the reason that we have found it possible to esterify Cnsl and produce crude anacardic esters by substantially the same procedures as have been given. However, Cnsl contains certain materials which appear to have a tendency to lessen the effectiveness of the catalysts which are used in certain of the described methods. We have found that this tendency can be wholly overcome by using a proportionately larger quantity of catalyst than has been indicated in the illustrative examples. In the case of sulphuric acid, we have found it advantageous to increase the upper limit from one quarter of one per cent (by volume on the anacardic acid) to six-tenths of one per cent (by volume on the Cnsl).

The crude esters prepared from Cnsl differ from the relatively pure esters prepared from the acid itself in that they are brown-black to black in color and generally contain between 10% and 20% of non-anacardic ester materials. As has been stated, for many of the industrial uses to which the esters are particularly well adapted it is really immaterial whether or not the esters are in a pure, light-colored state. For these uses the crude esters made from Cnsl are just as suitable as the relatively pure esters made from anacardic acid, and have the important advantage of lower cost. It should be pointed out that in certain of the compositions made from the crude esters, the presence of impurities has an appreciable effect on the plasticity, flow and cure. This is not necessarily a disadvantage, and it affords a way in which to modify certain of the properties of the product made from esters of anacardic acid.

It is thought to be clear from the foregoing disclosure that the esterification of anacardic acid and of Cnsl renders available as many raw materials for the manufacture of printing inks, varnishes, lacquers, impregnating agents, synthetic resins, molding compositions, etc. as there are available esters. Hence, it has now been rendered possible to prepare products derived from Cnsl and anacardic acid in a range of physical and chemical characteristics that appear well nigh limitless, in very marked contrast to the products previously obtainable from the same sources.

The esters possess other important advantages. For instance, they react more readily with certain reagents than does either Cnsl or anacardic acid, and are much more resistant to the effects of severe heating. Furthermore, they are substantially neutral which fact permits their use in conjunction with materials which would normally be adversely affected by the presence of acidic materials. Then again, because of the ester grouping they posses marked solvent and plasticizing properties which render them particularly suitable for incorporation with natural or synthetic gums, resins, rubbers, etc. They impart to the materials with which they are incorporated exceptional plasticity, toughness, shock resistance, etc. Unlike many other fluxes or plasticity agents, they end up in the final product as resins which are wholly compatible with the material with which they have been incorporated.

The esters of the present invention may also be employed instead of Cnsl, anacardic acid or other preservative to preserve lumber and timber from rot and decay as well as from insects. For this purpose, the particular ester employed may be heated or dissolved in a suitable solvent. They may also be used, as has been stated, as insecticides or germicides.

The foregoing specification and description include the essential and distinctive thought of our invention, but it is to be distinctly understood that the same may be modified in various ways or combined with various other details without affecting the peculiar results obtained, and without departing from the spirit of the invention or the scope of the appended claims in which we intend to claim all the patentable novelty inherent in our invention.

We claim:

1. The method of esterifying anacardic acid, which consists in heating a mixture of the anacardic acid with an excess of alcohol corresponding to the desired esterification product to a temperature not substantially above 200° C. in the presence of sulphuric acid as a catalyst.

2. The method of esterifying anacardic acid, which consists in heating a mixture of the anacardic acid with an alcohol corresponding to the desired esterification product to a temperature not substantially above 200° C. in the presence of sulphuric acid as a catalyst, and said alcohol being present in at least equi-molecular proportion, to the anacardic acid.

3. The method of esterifying anacardic acid, which consists in heating a mixture of the anacardic acid with an alcohol corresponding to the desired esterification product to a temperature not substantially above 200° C. in the presence of sulphuric acid, said alcohol being present in at least equi-molecular proportions to the anacardic acid, and said sulphuric acid being present in an amount equal to one quarter of a per cent of the anacardic acid material by volume.

4. The method of producing an ester from anacardic acid and a water-soluble, readily-distillable alcohol, which consists in forming a mixture containing anacardic acid, the alcohol corresponding to the desired ester, a water-insoluble solvent capable of forming an azeotropic mixture and sulphuric acid, the alcohol being in excess of the anacardic acid, heating the mixture under pressure and distilling off an azeotropic mixture of water and the water-insoluble solvent.

5. As a composition of matter, a mono ester of glycol with anacardic acid.

6. As a composition of matter, the esterification product of cashew nut shell liquid with a mono ether of glycol.

7. The method of esterifying anacardic acid, which consists in heating a mixture of the anacardic acid with an excess of an alcohol corresponding to the desired esterification product to a temperature sufficient to cause esterification but insufficient to cause rapid decarboxylation in the presence of an esterification catalyst.

8. The method of esterifying anacardic acid, which consists in heating a mixture of the anacardic acid with an excess of an alcohol corresponding to the desired esterification product to a temperature sufficient to cause esterification but insufficient to cause rapid decarboxylation in the presence of an esterification catalyst, said alcohol being present in at least equi-molecular proportions to the anacardic acid.

9. The method of producing an ester from anacardic acid and a readily-distillable alcohol, which consists in refluxing the anacardic acid and an excess of the alcohol in the presence of an esterification catalyst at a temperature sufficient to cause esterification but insufficient to cause rapid decarboxylation.

10. The method of producing an ester from anacardic acid and a readily-distillable alcohol, which consists in refluxing the anacardic acid and an excess of the alcohol in the presence of an esterification catalyst at a temperature sufficient to cause esterification but insufficient to cause rapid decarboxylation, said alcohol being present in excess of said anacardic acid.

11. The method of esterifying anacardic acid, which consists in heating a mixture of anacardic acid and an excess of an alcohol corresponding to the desired esterification product, the pH throughout the period of the reaction being maintained at not above 3 and the temperature being sufficient to cause esterification but insufficient to cause rapid decarboxylation.

12. The method of esterifying anacardic acid, which consists in heating a mixture of anacardic acid and an alcohol corresponding to the desired esterification product, said alcohol being present in at least equi-molecular proportions to the anacardic acid, the pH throughout the period of reaction being maintained at not above 3, and the temperature being sufficient to cause esterification but insufficient to cause rapid decarboxylation.

13. The method of esterifying anacardic acid, which consists in heating a mixture of anacardic acid and an excess of an alcohol corresponding to the desired esterification product, the pH throughout the period of the reaction being maintained at not above 3 and the temperature being not substantially above 200° C.

14. The method of producing an anacardic ester of a readily-distillable alcohol, which consists in refluxing a mixture of anacardic acid and an alcohol corresponding to the desired ester at temperatures not substantially above 200° C., the alcohol being present in excess of the anacardic acid and the pH throughout the period of reaction being maintained at not above 3.

15. The method of producing an anacardic ester of a readily-distillable alcohol, which consists in refluxing a mixture of anacardic acid and an alcohol corresponding to the desired ester in the presence of sulphuric acid as a catalyst at a temperature not substantially above 200° C., the alcohol being present in excess of the anacardic acid.

16. The method of producing the ethyl ester of anacardic acid, which consists in heating a mixture of anacardic acid and an excess of ethyl alcohol, while the pH of the mixture is maintained at not above 3, and distilling off the water of esterification.

17. The method of producing the ethyl ester of anacardic acid, which consists in heating a mixture of anacardic acid and an excess of ethyl alcohol in the presence of sulphuric acid as a catalyst, and distilling off the water of esterification.

18. The method of esterifying anacardic acid, which consists in first forming an alkali metal salt of the anacardic acid, and then heating said salt under esterification conditions with a substance selected from the class consisting of organic sulphates and chlorides which have an organic radical corresponding to the desired esterification product.

19. The method of producing the mono esters of glycol and anacardic acid, which consists in heating anacardic acid at an elevated temperature with an alkylene oxide corresponding to the desired ester in the presence of an alkali metal acetate.

EMIL E. NOVOTNY.
GEO. KARL VOGELSANG.